Nov. 6, 1934.  R. LEE  1,979,890
MOTOR CONTROLLING APPARATUS
Filed Jan. 15, 1934
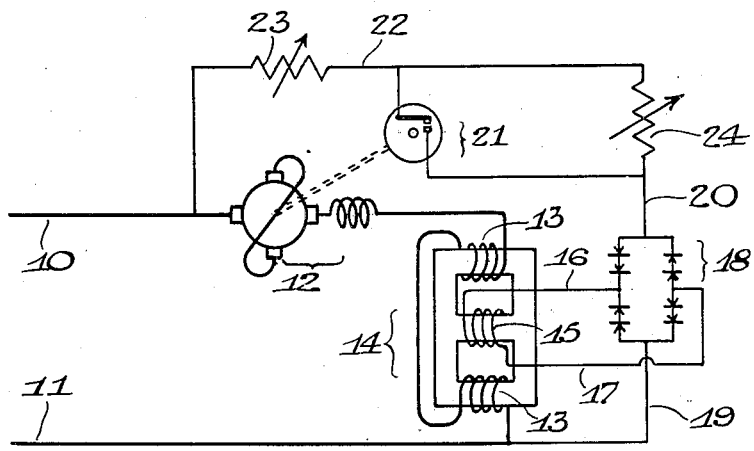

Patented Nov. 6, 1934

1,979,890

UNITED STATES PATENT OFFICE 1,979,890

MOTOR CONTROLLING APPARATUS

Royal Lee, Milwaukee, Wis., assignor to Lee Engineering Research Corporation, Milwaukee, Wis., a corporation of Wisconsin Application January 15, 1934, Serial No. 706,688

8 Claims. (Cl. 172—274)

The invention relates to speed-controlling apparatus for alternating current motors.

An object of the invention is to provide apparatus for controlling the speed of an alternating current motor, comprising a variable impedance reactor connected in circuit with the motor and having a direct current core-saturating winding, the direct current passing through the winding being produced by a rectifying device supplied by alternating current controlled by a motor-speed-influenced governor switch, the switch having contact members which are required to handle only a relatively small alternating current.

Another object of the invention is to further control the motor by a variable impedance in circuit with the rectifier.

The invention further consists in the several features hereinafter described and claimed.

The accompanying drawing shows a diagram of a motor controlling system embodying the invention.

In the drawing, 10 and 11 designate alternating current mains for supplying current to a variable speed motor 12 which may be of the series or repulsion type. The motor has connected in circuit therewith alternating current windings 13 of an iron core reactor 14 to limit the current flowing through the motor windings. The reactor is here shown to be of the type in which the core has three legs, the outer two legs carrying the windings 13, and there being no alternating flux in the middle leg.

A direct current core-saturating winding 15 is carried on the middle leg of the core and is connected by conductors 16 and 17 with the output terminals of a rectifying device 18, preferably of the full wave dry contact bridge type, such as the copper oxide variety. The saturating winding 15 preferably has a low time constant. One input terminal of the rectifier is connected to the main 11 by a conductor 19, and the other input terminal is connected by a conductor 20 with one contact member of an adjustable centrifugal circuit-breaker or governor switch 21 driven by the motor 12. The other terminal of the circuit-breaker is connected to the main 10 by a conductor 22. The centrifugal circuit-breaker may be of the general type shown in my United States Letters Patent No. 1,767,146, granted June 24, 1930.

In series with the input circuit of the rectifier is placed a variable impedance 23, preferably in the form of a rheostat, to serve as a torque control, as hereinafter described. The contact members of the circuit-breaker are bridged by a variable impedance 24, preferably in the form of a rheostat, to serve as an additional control, as hereinafter described. When the controlling functions of the impedances 2 and 24 are not needed, these impedances may be omitted.

In operation, alternating current flows from the mains through the motor 12 and reactor windings 13 in series, in the case of a series motor. Assuming that no direct current is flowing in the saturating winding 15 of the reactor, the windings 13 offer a high impedance sufficient either to hold the motor at a standstill or to permit rotation at a slow speed, as desired. If the centrifugal switch is now set to close, an alternating current circuit will be completed through the rectifier 18, causing a direct current to flow through the reactor winding 15 for saturating the reactor core, thereby greatly reducing the impedance of the windings 13 and causing the motor speed to increase. When the motor reaches a predetermined speed, the contact members of the centrifugal circuit-breaker 21 separate, thereby opening the rectifier circuit and de-energizing the saturating winding 15, so as to increase the impedance of the reactor. The motor is thus prevented from increasing its speed. An incipient decrease in motor speed results in reclosing of the centrifugal circuit-breaker, and the cycle of operation is then repeated holding the motor at the desired speed.

When the impedance 24 is used, the direct current flowing through the reactor winding 15 will not drop to zero when the centrifugal switch remains open. In such case the motor may attain a speed above that at which the governor switch is set to open, and if the motor load increases, the motor will slow down to the governor-controlled speed. The impedance can also be set so as to provide a close speed regulation.

When the impedance 23 is used, the direct current flowing in the saturating winding is variably limited, so that while the motor will remain at a predetermined speed up to a given load, it will drop in speed when greater turning resistance is encountered. This is useful when the motor is used in drilling, tapping and other machining operations to thereby avoid breakage of tools or work.

The invention is useful in connection with variable speed motors for driving printing presses, conveyors, textile and paper machinery, machine tools, and other mechanisms requiring adjustable operating speeds. By gradually adjusting the governor switch, the load can be smoothly accelerated to its operating speed. The impedances 23 or 24 may also be used for this purpose.

The apparatus consists of relatively few parts which are of inexpensive and rugged character. The governor contact members will have a long service life, since they are required to handle only a relatively small alternating current.

What I claim as new and desire to secure by Letters Patent is:

1. Motor controlling apparatus comprising a variable speed alternating current motor, a variable impedance reactor in circuit with said motor and having a direct current saturating winding, a rectifier for supplying direct current to said saturating winding, and a motor-speed-influenced governor for controlling the flow of alternating current to said rectifier.

2. Apparatus for controlling the speed of an alternating current motor, comprising a variable impedance reactor for circuit connection with said motor and having a direct current saturating winding, a rectifier for supplying direct current to said saturating winding, and a motor-speed-influenced governor for controlling the flow of alternating current to said rectifier.

3. Apparatus for controlling the speed of an alternating current motor, comprising a variable impedance reactor for circuit connection with said motor and having a direct current saturating winding, a rectifier for supplying direct current to said saturating winding, and a motor-speed-influenced switch having relatively movable contact members for interrupting the flow of alternating current to said rectifier.

4. Apparatus for controlling the speed of an alternating current motor, comprising a variable impedance reactor for circuit connection with said motor and having a direct current saturating winding, a rectifier for supplying direct current to said saturating winding, a motor-speed-influenced governor for controlling the flow of alternating current to said rectifier, and an impedance for limiting the flow of alternating current to the rectifier.

5. Apparatus for controlling the speed of an alternating current motor, comprising a variable impedance reactor for circuit connection with said motor and having a direct current saturating winding, a rectifier for supplying direct current to said saturating winding, a motor-speed-influenced switch having relatively movable contact members for interrupting the flow of alternating current to said rectifier, and an impedance bridging said contact members.

6. Apparatus for controlling the speed of an alternating current motor, comprising a variable impedance reactor for circuit connection with said motor and having a direct current saturating winding, a dry contact bridge type rectifier for supplying direct current to said saturating winding, and a motor-speed-influenced governor for controlling the flow of alternating current to said rectifier.

7. Apparatus for controlling the speed of an alternating current motor, comprising a variable impedance reactor for circuit connection with said motor and having a direct current saturating winding, a rectifier for supplying direct current to said saturating winding, and a motor-speed-influenced governor for controlling the flow of current to said saturating winding.

8. Apparatus for controlling the speed of an alternating current motor, comprising a variable impedance reactor for circuit connection with said motor and having a direct current saturating winding, a rectifier for supplying direct current to said saturating winding, and automatically operating switch means having relatively movable contact members for interrupting the flow of alternating current to said rectifier.

ROYAL LEE.